United States Patent
Fidan et al.

(10) Patent No.: US 8,245,780 B2
(45) Date of Patent: Aug. 21, 2012

(54) METHOD OF DETECTING FLUID IN-FLOWS DOWNHOLE

(75) Inventors: Erkan Fidan, Calgary (CA); Menno Mathieu Molenaar, Calgary (CA); Bora Oz, Calgary (CA); Michael Charles Minchau, Calgary (CA)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/148,424

(22) PCT Filed: Feb. 9, 2010

(86) PCT No.: PCT/US2010/023627
§ 371 (c)(1),
(2), (4) Date: Sep. 29, 2011

(87) PCT Pub. No.: WO2010/091404
PCT Pub. Date: Aug. 12, 2010

(65) Prior Publication Data
US 2012/0018149 A1   Jan. 26, 2012

Related U.S. Application Data

(60) Provisional application No. 61/150,842, filed on Feb. 9, 2009.

(51) Int. Cl.
*E21B 47/00* (2006.01)
(52) U.S. Cl. .................. 166/250.03; 166/254.2
(58) Field of Classification Search .............. 166/64, 166/250.01, 250.03, 254.2, 72; 250/227.14, 250/227.16, 227.18
See application file for complete search history.

(56) References Cited

U.S. PATENT DOCUMENTS

| | | | | |
|---|---|---|---|---|
| 5,363,094 A | * | 11/1994 | Staron et al. | 340/854.6 |
| 5,396,045 A | | 3/1995 | Opdyke | 219/121.69 |
| 5,892,860 A | | 4/1999 | Maron et al. | 385/12 |
| 6,209,640 B1 | * | 4/2001 | Reimers et al. | 166/254.1 |
| 6,268,911 B1 | | 7/2001 | Tubel et al. | 356/72 |
| 6,281,489 B1 | | 8/2001 | Tubel et al. | 250/227.14 |
| 6,354,147 B1 | | 3/2002 | Gysling et al. | 73/61.79 |
| 6,414,294 B1 | | 7/2002 | Marshall et al. | 250/208.1 |

(Continued)

FOREIGN PATENT DOCUMENTS

GB       2364380        1/2002

(Continued)

OTHER PUBLICATIONS

Physics World; "Optasense Intruder Detection Solutions for Borders, Perimeters and Pipelines"; 3 pages.

(Continued)

*Primary Examiner* — Daniel P Stephenson

(57) ABSTRACT

A method of measuring fluid in-flow in a region of interest in a wellbore comprises deploying a fiber optic cable concurrently with placement of a downhole tubular, transmitting a light signal along the cable and receiving a reflected signal from the region of interest, and interpreting the received signal to obtain information about fluid flowing in the region of interest. The wellbore may include a horizontal portion. The received signal may also be interpreted by assessing amplitude and frequency spectra across array of channels, conditioning the received signal by removing at least a portion of the signal that is not related to flow, assessing flow regimes across depths and times, calculating axial flow/s within the wellbore using relationships for axial flow, and calculating flow into or out of the wellbore at one or more points using relationships for flow through an orifice.

8 Claims, 2 Drawing Sheets

U.S. PATENT DOCUMENTS

| | | | |
|---|---|---|---|
| 6,547,435 B1 | 4/2003 | Grosswig et al. | 374/137 |
| 6,588,266 B2 | 7/2003 | Tubel et al. | 73/152.39 |
| 6,787,758 B2 | 9/2004 | Tubel et al. | 250/227.14 |
| 7,040,390 B2 | 5/2006 | Tubel et al. | 166/64 |
| 7,201,221 B2 | 4/2007 | Tubel et al. | 166/64 |
| 7,289,909 B2 | 10/2007 | Thomann et al. | 702/6 |
| 7,315,666 B2 | 1/2008 | Van der Spek | 385/12 |
| 7,448,447 B2 * | 11/2008 | Walford | 166/250.01 |
| 7,652,245 B2 | 1/2010 | Crickmore et al. | 250/227.12 |
| 7,668,411 B2 | 2/2010 | Davies et al. | 385/12 |
| 7,740,064 B2 | 6/2010 | McCoy et al. | 166/250.01 |
| 7,946,341 B2 | 5/2011 | Hartog et al. | 166/254.1 |
| 7,954,560 B2 | 6/2011 | Mathiszik et al. | 175/50 |
| 2003/0205083 A1 | 11/2003 | Tubel et al. | 73/152.19 |
| 2004/0043501 A1 | 3/2004 | Means et al. | 436/164 |
| 2007/0129613 A1 | 6/2007 | Rochester et al. | 600/310 |
| 2008/0271926 A1 | 11/2008 | Coronado et al. | 175/323 |
| 2009/0080828 A1 | 3/2009 | Nash et al. | 385/12 |
| 2009/0188665 A1 | 7/2009 | Tubel et al. | 166/250.01 |
| 2010/0107754 A1 | 5/2010 | Hartog et al. | 73/152.47 |
| 2010/0207019 A1 | 8/2010 | Hartog et al. | 250/269.1 |
| 2010/0315630 A1 | 12/2010 | Ramos et al. | 356/301 |
| 2011/0044574 A1 | 2/2011 | Strong | 385/12 |
| 2011/0069302 A1 | 3/2011 | Hill et al. | 356/73.1 |
| 2011/0088462 A1 | 4/2011 | Samson et al. | 73/152.18 |
| 2011/0088910 A1 | 4/2011 | McCann et al. | 166/344 |
| 2011/0149688 A1 | 6/2011 | Hill et al. | 367/87 |
| 2011/0185815 A1 | 8/2011 | McCann | 73/655 |
| 2011/0216996 A1 | 9/2011 | Rogers | 385/12 |
| 2011/0280103 A1 | 11/2011 | Bostick, III | 367/35 |
| 2011/0292763 A1 | 12/2011 | Coates et al. | 367/25 |
| 2012/0017687 A1 | 1/2012 | Davis et al. | 73/655 |
| 2012/0018149 A1 | 1/2012 | Fidan et al. | 166/250.03 |

FOREIGN PATENT DOCUMENTS

| | | |
|---|---|---|
| WO | WO2009158630 | 12/2009 |
| WO | WO2010010318 | 1/2010 |
| WO | WO2010034986 | 4/2010 |
| WO | WO2010136764 | 12/2010 |
| WO | WO2010136810 | 12/2010 |
| WO | WO2011010110 | 1/2011 |
| WO | WO2011039501 | 4/2011 |
| WO | WO2011058312 | 5/2011 |
| WO | WO2011058313 | 5/2011 |
| WO | WO2011058314 | 5/2011 |
| WO | WO2011058322 | 5/2011 |
| WO | WO2011067554 | 6/2011 |
| WO | WO2011076850 | 6/2011 |
| WO | WO2011079107 | 6/2011 |
| WO | WO2011141537 | 11/2011 |
| WO | WO2011148128 | 12/2011 |

OTHER PUBLICATIONS

Article, "QuinetiQ Launches OptaSense for Border, Pipeline and Cable Security Applications"; 2007.

* cited by examiner

METHOD OF DETECTING FLUID IN-FLOWS DOWNHOLE

PRIORITY CLAIM

The present application claims priority from PCT/US2010/023627, filed 9 Feb. 2010, which claims priority from U.S. Provisional Applications 61/150,842, filed 9 Feb. 2009, both of which are incorporated by reference.

BACKGROUND OF THE INVENTION

In the context of oil and/or gas drilling it is frequently advantageous to detect the flow of fluid into a wellbore. Regardless of whether a flow of gas or liquid into a well is expected, as in the case of production, or unexpected, as in the case of poor formation sealing, information about the location and/or rate of flow can be used to guide subsequent action. Because the environment several thousand feet down in a well tends to be hot, highly pressurized, and variable, many types of sensors that are effective in ambient conditions at the earth's surface are not effective for downhole applications. Hence, it is desirable to provide sensors that can provide accurate fluid flow information downhole and a method for using the same.

Various types of fiber optical systems for measuring mechanical events on the earth's surface are known. For example, U.S. Pat. No. 7,040,390 discloses a security system that uses the intensity and backscattering of optical signals to detect and locate mechanical disturbances to a perimeter border formed of optical cable. Also known are fiber optical sensors for use in downhole flow meters that use strain-sensitive Bragg gratings in a core of one or more optical fibers. The sensors may be combination pressure and temperature (P/T) sensors, such as are described in U.S. Pat. No. 5,892,860, entitled "Multi-Parameter Fiber Optic Sensor For Use In Harsh Environments." Alternatively, downhole flow measurement systems may use a fiber optic differential pressure sensor or velocity sensors similar to those described in U.S. Pat. No. 6,354,147, entitled "Fluid Parameter Measurement In Pipes Using Acoustic Pressures."

Similar systems are also disclosed in U.S. Pat. Nos. 7,652,245, 6,414,294, 6396,045, and Application Nos. 2009/0080828 and 2007/0129613, all of which are incorporated herein by reference.

In addition, noise logging conducted inside production tubulars is known in the industry and has been used for the determination of fluid flow in wells for both inflow and outflow (injection) settings with gas and liquids. A noise log is a record of the sound, produced by fluid flow, measured by a microphone at different positions in the borehole. The log may be either a continuous record against depth or a series of stationary readings. Analysis correlating flow-rates to amplitude of recorded noise at various frequencies is well established for conventional microphone devices. Nonetheless, problems with the existing technology as applied to flow measurement across the full well life cycle, from hydraulic fracture stimulations through production operations, include:
  the acquisition of this information requires a well intervention activity and gathers data over a limited time interval; acquiring data over full life cycle of the well would be operationally expensive and impractical;
  to achieve near continuous coverage over the entire wellbore, an impractically large number of microphones would need to be deployed;
  the existing noise logging technique is unable to acquire data beneath wellbore obstructions, such as bridge plugs;
  conducting the measurement in a horizontal well, for example, is operationally complex, presents mechanical risks, and is costly;
  to match the frequency range provided by this invention would require the use of multiple microphones with a range of frequencies;
  long term reliability of the tools for continuous use would be an issue;
  the introduction of the logging tool, by its presence in the flow conduit, can change the flowing conditions of the well when conducting measurements and can be an unwanted flow restriction during operations, especially during hydraulic fracture stimulation activities; and
  the wireline cable and logging tool for noise-logging are unlikely to effectively operate in the harsh downhole environment during hydraulic fracture or acid stimulation. The stimulation fluids can for example contain high proppant concentrations which will lead to erosion or the injection fluid contains acid or $CO2$ which will yield corrosion. This will cause in-wellbore equipment to fail during these operations.

On the other hand, installing microphones outside the production tubulars presents the following problems:
  the microphones need to be sufficiently robust to survive the installation process of running the tubulars into harsh subsurface environment (including possible cementing operations);
  to provide near continuous on depth coverage and the broadband frequencies would require that an impractically large number of microphones and cables be installed which would complicate installation activities;
  the microphones would need to be sufficiently robust to survive the elevated pressures associated with hydraulic fracture stimulation as well, while maintaining the sensitivity needed for behind conduit measurement; and
  microphones would be required to have high reliability over the full life of the well, which is not practically available.

Thus, despite the advances that have been made, it remains desirable to provide a low-cost, system that is robust and easy to install and operate, and that provides accurate flow information downhole.

In particular, Optical Time-Domain Reflectometry (OTDR) techniques for detecting acoustic disturbances, with conventional telecom optical fibers as the sensing element are well known in the security and surveillance business. OTDR techniques with optical fibers for detecting leaks from pipelines are also known. One problem with applying these techniques downhole is that the existing technologies are useful for detecting a flow point but they have not been calibrated to the degree necessary to provide quantification of flowrates, flowregimes, fluid compositions, or changing conditions of the flow point in this setting, and they have not been calibrated for axial flow quantification.

SUMMARY OF THE INVENTION

The present invention provides a method for accurately detecting and/or measuring a flow of fluid into a borehole. The present method includes deploying one or more fiber optic cables into the borehole, either along its length or in one or more regions of interest in the hole. The fiber optic cable(s) can be deployed on casing, production tubing, or on other downhole equipment and are preferably deployed concurrently with drilling or completion operations. Light signals are transmitted along the length of the cable and used to detect, measure, and/or locate the flow of fluid into the borehole.

The invention uses an OTDR system that is capable of measuring intensity-modulated signals related to multiple discrete segments, the segments can be measured independently and virtually simultaneously along the entire fiber, thereby using the complete fiber as a sensor.

In some embodiments, the invention comprises a method of measuring fluid in-flow in a region of interest in a wellbore by a) deploying a fiber optic cable concurrently with placement of a downhole tubular, b) transmitting a light signal along the cable and receiving a reflected signal from the region of interest, c) interpreting the received signal to obtain information about fluid flowing into the wellbore in the region of interest. The fiber optic cable may be free of Bragg gratings. In some embodiments, step c) may include detecting a change over time in said received signal and interpreting that change so as to obtain information about a change in fluid inflow. The wellbore may include a horizontal portion, and/or the wellbore may contain a velocity string. If the wellbore contains a velocity string, step c) is preferably carried out without removing the velocity string.

In some embodiments, the present invention allows for measurement of fluid flow rates through a wellbore conduit and quantification of flowrates at discrete entry points along the wellbore conduit. The flows can be either inflow from the reservoir into the wellbore or outflow (injection) from the wellbore into the reservoir. The system can apportion flow to discrete flow intervals wherever they appear along the entire wellbore as well as measure flowrates in the wellbore conduit along the entire wellbore or. It maybe a permanent installation allowing measurement of fluid flows throughout the entire well life cycle which may include, hydraulic fracture stimulation, hydraulic fracture flowback and cleanup operations, and throughout producing operations.

The downhole portion of the system is preferably installed external to the production conduit, providing an unrestricted flow conduit for well operations and production. The flow sensors are of a continuous nature, which provides coverage of flow measurement over the entire wellbore simultaneously. The system has the capability of measuring a broad range of frequencies of noise energy along the entire wellbore over the full well life enabling the enhanced application of advanced modeling techniques to locate, characterize and quantify axial flow rates within the conduit and flow rates at discrete entry points and changes over time. The fiber sensor can be installed in a harsh downhole environment with minimal concern about depth placement and due to the simplicity of the sensor has proven high reliability.

DETAILED DESCRIPTION OF THE PREFERRED EMBODIMENTS

Figure 1:
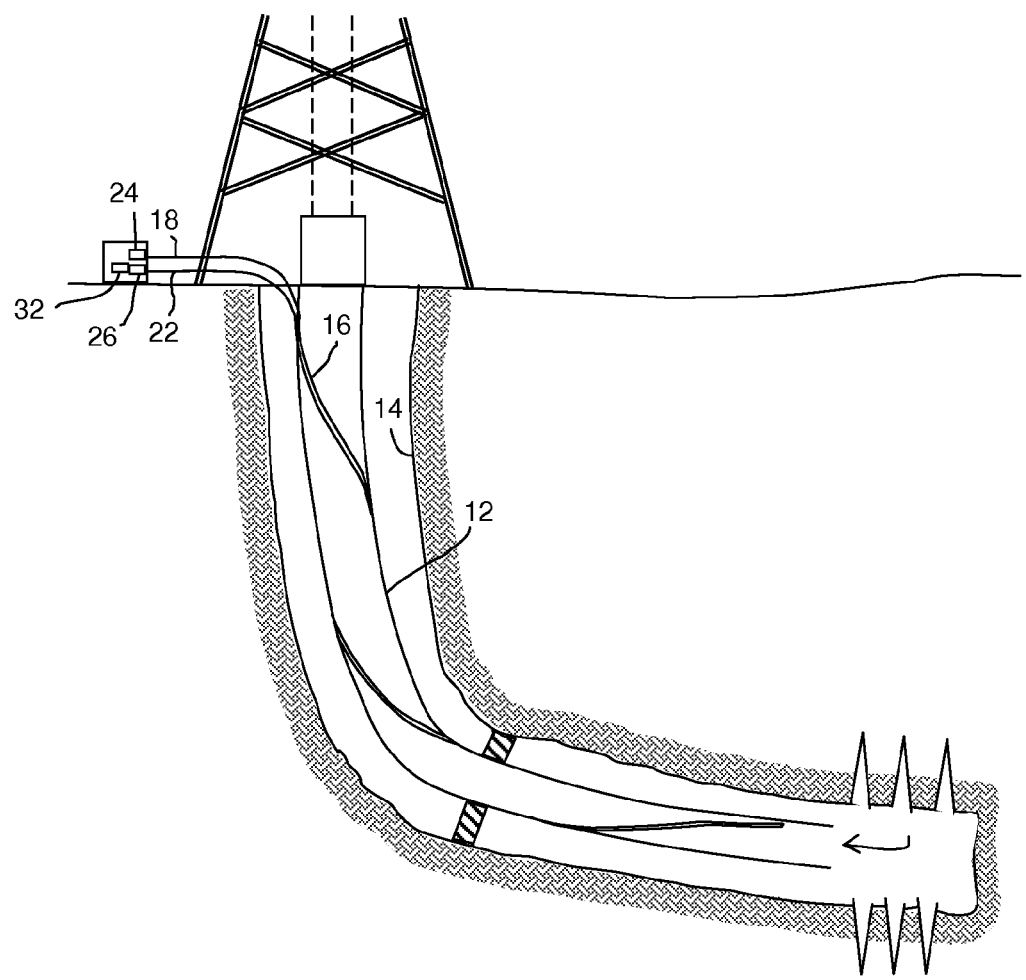
FIGS. 1 and 2 are schematic illustrations of embodiments of the invention a wellbore.

According to the embodiment illustrated in FIG. 1, a fiber optic cable 16 is secured to a production tubing 12 and disposed in a wellbore 14. The cable is preferably supported on the tubing such that a fluid flowing in the wellbore past the cable will cause a deformation in the fiber optic cable, regardless the state of deformation of the casing 12.

Figure 2:
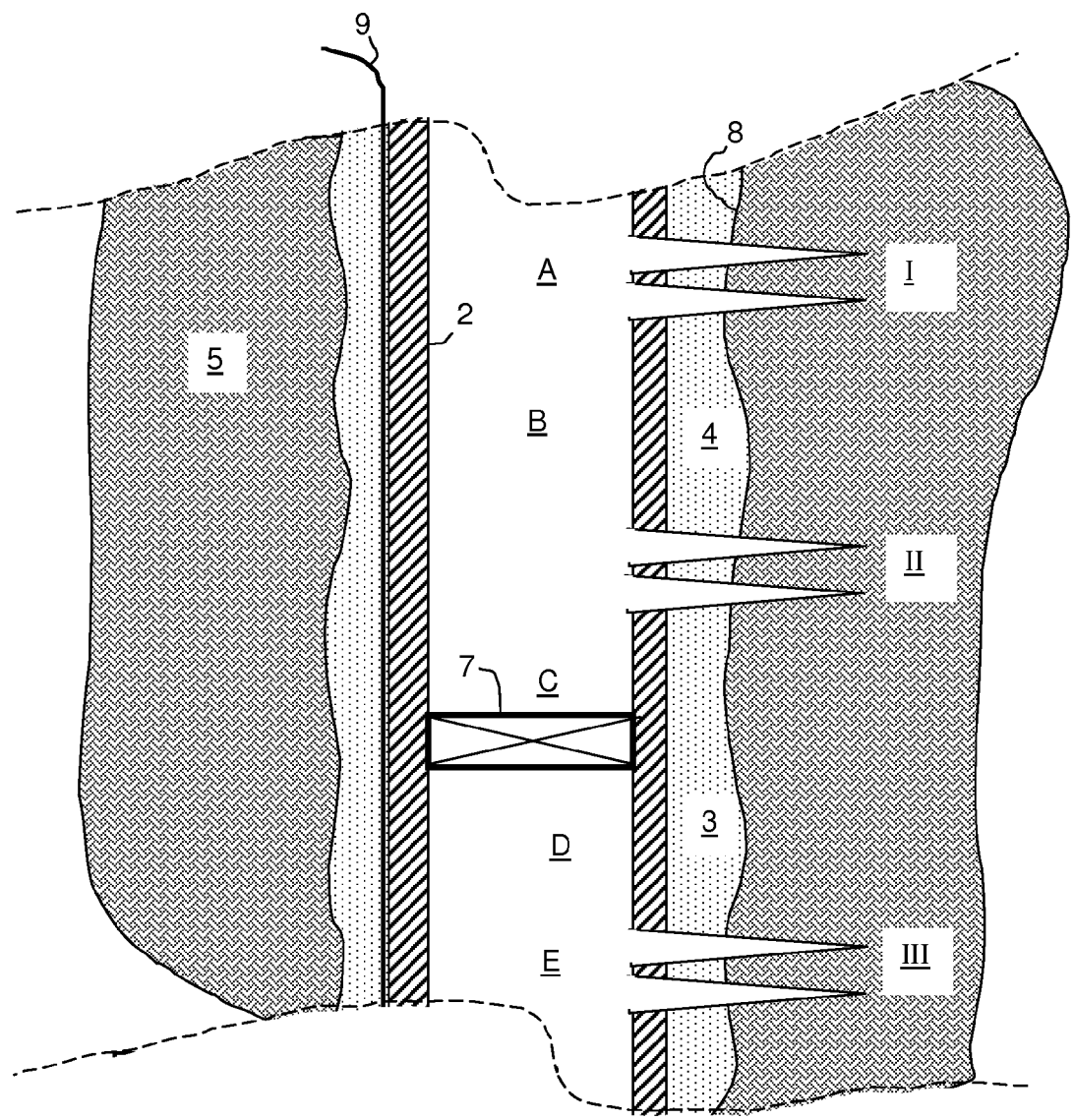

Referring briefly to FIG. 2, a wellbore 8 is drilled in a formation 5. To prevent wellbore 8 from collapsing and/or to otherwise line or reinforce wellbore 8, wellbore 8 includes a string of casings 2 that are inserted and cemented in wellbore 8. Cement 3 is pumped up an annulus 4 between casing 2 and the wall of wellbore 8 to provide a bonded cement sheath that secures casing 2 in wellbore 8. A plurality of perforations I, II, III extend through the casing 2 and the cement 3 and into the formation 5.

For purpose of illustration a plug 7 inserted in casing 2. Plug 7 functions as isolation between the upper part of the well conduit (A, B & C) and the lower part of the well conduit (D & E)

If by design the production casing is not cemented in place, packers around/outside the production casing can be placed to isolate the different entry point to the formation (not illustrated in the Figures) and simple holes in the casing will suffice instead of perforations.

An optical cable 9 is preferably supported on the casing 2 by the cement 3 and/or by cable clamps (not illustrated in the FIG. 2) such that a fluid flowing in the adjacent wellbore will cause a deformation in the fiber optic cable.

In accordance with the present invention, a downhole fluid flow sensing system is provided in which at least one fiber optic cable 9 is deployed downhole, either outside of casing, as shown in FIG. 2, or otherwise, such as on production tubing, as shown in FIG. 1. The fiber optic cable may alternatively be deployed on a velocity string, or any other downhole component that is capable of supporting the fiber optic cable. In preferred embodiments, the fiber optic cable is affixed to casing or the like, so that it is in place throughout the life of the well and is already in place whenever it becomes desirable to measure flow into the wellbore. It will be understood that discussions herein relating to fiber optic cable and measurements made therewith are made without limitation on the positioning or mode of deployment of the cable in the well.

A light transmission means disposed at a first end of the fiber optic cable transmits at least one light pulse from a light source through the fiber optic cable. The cable may be double-ended, i.e. may be bent in the middle so that both ends of the cable are at the surface, or may be single-ended, with one end in the hole and one end at the surface. In the latter case, measurements can be based solely on backscattered light. In the case of a double-ended cable, a light receiving means is preferably provided at the second end, to measure the intensity of light at the second end of the fiber optic cable.

When the fiber optic cable is in place in a well, fluid flowing into the well will cause acoustic vibrations, or "noise." When these vibrations pass through the fiber, they cause minute but detectable strain, which in turn affects the transmission and backscattering of light in the cable. Thus, fluid flow can be measured using measurements of the intensity and timing of the backscattered light, intensity of the light received at the second cable end, or a combination of both. Thus, in various embodiments, the system includes at least one of a detector that receives backscattered light from the second cable end and a detector that receives transmitted light at the second end.

According to one embodiment, in the system illustrated in FIG. 1, a fiber optic cable 16 is secured to a production tubing 12 and disposed in a wellbore 14. The cable is preferably supported on the tubing such that a fluid flowing past the cable will cause a deformation in the fiber optic cable, regardless the state of deformation of the tubing 12. The deformation causes a detectable attenuation in the intensity of the light signal that passes through the fiber and also causes a detectable increase in the backscattered light intensity that is received by the photodetector for that point along the fiber optic cable.

If cable 9 or 16 is a double-ended cable having a first end 18 and a second end 22 at the surface, as shown, a first light source 24 preferably emits light through first end 18. A first photodetector 26 disposed at second end 22 receives the emitted light. The level or intensity of light received by the first photodetector 26 is compared to a base level, where the base level is the intensity that is received at the first photodetector 26 when the system is in normal operation with no corruption to the fiber optic cable 16.

In some embodiments, when the intensity of light detected at the first photodetector 26 falls below the base level by a predetermined amount, internal circuitry triggers a second light source that is inherent in an optical time domain reflectometer 32 (OTDR) to transmit light into fiber optic cable 16 or 9. If the frequency of the second light source is the same as the frequency from the first light source 24 then the first light source 24 must shut down.

Using OTDR technology, which is known in the art, it is possible to determine an amount of backscattered light at each point along the fiber optic cable 16. A fiber optic cable 16 inherently contains an even distribution of impurities which forces a reflection of light back toward the light source. The OTDR preferably utilizes a second photodetector (not shown) that receives the backscattered light.

In one embodiment, the OTDR 32 continuously samples the amount of backscattered light at each point along the fiber optic cable 9 or 16 and compares the backscattered light intensity at along the fiber optic cable 9 or 16 with a previous sample to determine where a sufficient change in backscattered light intensity has occurred. In another embodiment, the OTDR 32 is actuated by a detection of a loss in light intensity at the second end 28 of the fiber optic cable 9 or 16.

Therefore, a deformation in the fiber optic cable 16 results in a loss of light intensity at the second end 28 of the fiber optic cable 16. Further, the location of the deformation along the fiber optic cable 16 can be readily determined using the OTDR 32.

Thus, localized flowing of liquid or gas into or out of the well will cause a deformation in fiber optic cable 16. By determining the location of the deformation, the location of the fluid inflow can be determined.

It is anticipated that the peak frequency of a signal associated with a low fluid flow rate will be lower than the peak frequency of a signal associated with a high fluid flow rate. Nonetheless, it is also anticipated that various factors may affect the peak frequency and other properties of the detected signals and preferred methods will include analyzing the signals using calibration, comparison, and other techniques in order to optimally assess the received data.

One or more fiber optic cables may be wrapped around the casing or tubing or otherwise mounted on or affixed to it so as to provide the desired level of sensitivity to fluid flow. At least one light source and at least one detector are preferably provided for each fiber optic cable. Alternatively, an OTDR having an optical switcher can operate to monitor multiple fiber optic cables.

The present OTDR technique as previously described is responsive to deformation; therefore it does not have the same response as a conventional microphone. Correlations of the "noise" from flow past a fiber in a downhole setting have not been previously known. Separating out signal that is not due to flow requires data processing steps. The present OTDR system preferably records signals across broad bandwidths such as less than 1 Hz to larger than 5000 Hz, long time frames from minutes to years, and along nearly the full length of the fibered wellbore, which enables the application of improved modeling and processing routines. The recording of data simultaneously across multiple channels and wide frequency bands allows the practitioner to identify areas that have "clean" signal characteristic of an identified flow regime to which a reliable correlation can be applied. Correlations applied to noise due to axial flow (for example FIG. 2 well conduit sections A, B, C and D) are considerably different from correlations for noise due to a localized in- or outflow point (for example FIG. 2 perforations I, II and III) that would occur at an orifice. Calculations of fluid flow for both of these regimes can be made and compared so that errors are minimized.

We analyse the signals at various frequencies and ascribe meaning to the combination of frequencies and amplitudes over time and along the wellbore. By way of example only, the following steps may be carried out:

1. Input: Intensity-modulated signal from OTDR across multiple channels and well information
2. Assess amplitude and frequency spectra across array of channels
3. Condition data by removing signal not related to flow. This may be carried out, by way of example only, by selective frequency filtering or by identification and exclusion of data contaminated signal due to other processes.
4. Assess flow regimes across depths and times.
4.1. Calculate axial flow/s within conduit using relationships for axial flow. Depending on the inflow/outflow contributions from the perforations I and II, there will be a difference in the axial flow conditions for the wellbore sections A and B. The difference in axial flow will show-up as a difference in frequency spectra as well as amplitude. By way of example only, in FIG. 2. plug 7 is set to prevent flow between wellbore section A/B/C and D/E. Unless plug 7 is leaking or a channel exists in the cement 3, then by applying steps 3 and 4 will then show no flow conditions in wellbore section D and E.
4.2. Calculate inflow/outflow/s at flow points using relationships for flow through an orifice. Continuing the foregoing example, for perforations I and II, there will be a difference in frequency spectra as well as amplitude for different flow rates. In FIG. 2. plug 7 is set to prevent flow between wellbore section A/B/C and D/E. Unless plug 7 is leaking or a channel exist in the cement 3 then by applying steps 3 and 4 will then show no flow rates at perforations III.
5. (Optionally) Compare results of two methods and minimize errors using additional constraining information if available (wellhead flowrates, temperature measurements, etc.).

For example, the present techniques can be used to identify during hydraulic fracturing when sand arrives at the perforations downhole. Likewise, the present techniques can be used to monitor the flow into each set of perforations and identify instances of erosion. Conversely, the gathered data could be used to identify the build-up of scale that might tend to close or restrict perforations during production.

There are some situations in which the present system is particularly advantageous. For example, in wellbores in which a velocity string has been installed for the purpose of ensuring sufficient gas velocity, conventional techniques for measuring in-flow entail pulling the velocity string and running a production logging tool into the well. However, this technique has the drawback of changing the geometry of the well, as a result of removal of the velocity string, which in turn may affect the in-flow of fluid. In addition, this technique entails a costly removal and replacement of the velocity string. If a flow measurement system in accordance with the present invention were in place, fluid in-flow can be measured continuously, regardless of the presence or absence of a velocity string.

Similarly, it is often difficult to run fluid measurements devices into wells that are highly deviated, as gravity alone is not sufficient to overcome friction in the well. If a portion of the well is horizontal, it may be impossible to lower a measurement device to the bottom of the hole, or it may be necessary to use a downhole tractor to do so. In contrast, if a system in accordance with the present invention were installed during drilling or completion of the well, such efforts would not be necessary.

Still further, the techniques taught herein can be used in conjunction with other known techniques, such as the of a distributed temperature log, to provide more detailed or more accurate information about fluid in-flows.

The present invention has been disclosed and described with respect to preferred embodiments. It will be understood, however, that various modifications can be made to the systems described herein without departing from the scope of the claims below.

The invention claimed is:

1. A method of measuring fluid in-flow in a region of interest in a wellbore, comprising:
   a) deploying a fiber optic cable concurrently with placement of a downhole tubular;
   b) transmitting a light signal along the cable and receiving a reflected signal from the region of interest; and
   c) interpreting the received signal to obtain information about fluid flowing into or out of the wellbore in the region of interest;
   wherein step c) comprises:
      i) assessing amplitude and frequency spectra across an array of channels;
      ii) conditioning the received signal by removing at least a portion of the signal that is not related to flow;
      iii) assessing flow regimes across depths and times;
      iv) calculating axial flow/s within the wellbore using relationships for axial flow; and
      v) calculating flow into or out of the wellbore at one or more points using relationships for flow through an orifice.

2. The method according to claim 1 wherein the wellbore contains a velocity string and step c) is carried out without removing the velocity string.

3. The method according to claim 1 wherein the wellbore includes a horizontal portion.

4. The method according to claim 1 wherein the fiber optic cable is free of Bragg gratings.

5. The method according to claim 1 wherein step c) further includes:
   c1) detecting a change over time in said received signal; and
   c2) interpreting said change so as to obtain information about a change in fluid inflow.

6. The method according to claim 1 wherein step c) further includes the step of:
   vi) comparing the results of steps iv) and v), and minimizing errors using additional constraining information.

7. The method according to claim 6 wherein the addition constraining information is selected from the group consisting of wellhead flowrates, and temperature measurements.

8. The method according to claim 1, further including the steps of:
   d) repeating steps a) and b) over time so as to obtain information about a change in fluid inflow.

* * * * *